United States Patent [19]

Fox et al.

[11] Patent Number: 4,924,372

[45] Date of Patent: May 8, 1990

[54] SINGLE PHASE RECTIFIER CIRCUIT

[75] Inventors: David A. Fox, Shawnee Township, Allen County; David L. Stechschulte, Pleasant Township, Putnam County, both of Ohio

[73] Assignee: Westinghouse Electric Corp., Pittsburgh, Pa.

[21] Appl. No.: 385,845

[22] Filed: Jul. 26, 1989

[51] Int. Cl.⁵ .............................................. H02M 7/06
[52] U.S. Cl. ....................................... 363/89; 363/126; 323/222
[58] Field of Search ...................... 363/44–48, 363/89, 124, 126, 127; 323/222

[56] References Cited

U.S. PATENT DOCUMENTS

| | | | |
|---|---|---|---|
| 4,074,344 | 2/1978 | Pitel | 363/89 |
| 4,412,277 | 10/1983 | Mitchell | 363/89 |
| 4,502,104 | 2/1985 | Mitchell | 363/89 |
| 4,654,774 | 3/1987 | Lemmers | 363/126 |
| 4,677,366 | 6/1987 | Wilkinson et al. | |
| 4,683,529 | 7/1987 | Bucher, II | 363/126 |
| 4,688,162 | 8/1987 | Mutch et al. | 363/126 |
| 4,712,169 | 12/1987 | Albach | 363/89 |

OTHER PUBLICATIONS

Hall, Brad, "Correct Power Factor in Switched Mode Power Supplies," in Electronic Design, Oct. 27, 1988.

*Primary Examiner*—Peter S. Wong
*Attorney, Agent, or Firm*—R. P. Lenart

[57] ABSTRACT

A single phase rectifier circuit produces a full wave rectified voltage by rectifying an AC input voltage, couples the rectified voltage to a filter capacitor through an inductor, and repeatedly switches the sum of the rectified voltage and the voltage on the capacitor across the inductor, thereby reducing input current distortion and improving the power factor of the circuit. When the rectified voltage is of a sufficient magnitude to drive current through the inductor, switching of the capacitor voltage across the inductor can be eliminated. The switching function is performed by a half bridge boost converter.

8 Claims, 4 Drawing Sheets

SINGLE PHASE RECTIFIER CIRCUIT

BACKGROUND OF THE INVENTION

This invention relates to electronic rectifier circuits and, more particularly, to single phase circuits having a low input current distortion.

A basic single phase rectifier circuit includes a full wave bridge for rectifying an AC input voltage and a circuit branch including the series connection of an inductor and a capacitor which is connected across the output terminals of the bridge. The capacitor voltage is delivered to a load. Efficient conversion of single phase AC to DC voltage is hampered by non-sinusoidal input currents which result from the operation of such circuits. If the inductance of the inductor is very large, the input current of the bridge rectifier approximates a square wave. For more practical values of inductance, the input current consists of the sum of a square wave and a lagging fundamental component of the current. Such input currents have a very large total harmonic distortion, which causes the input power factor to be low, limiting the power available from a given wire or protective device. The distorted input currents will cause distortion in the line voltage. Ideally, the input current should look like the input voltage, so that the rectifier appears as a linear, resistive load to the rest of the power system, yielding unity input power factor and an ideal current crest factor of 1.414.

To reduce the input current distortion of the basic rectifier circuit described above, a boost converter can be added by placing a diode between the inductor and capacitor and connecting a switching device across the series connection of the diode and capacitor. The switching device can be turned on and off to develop a DC voltage on the capacitor which exceeds the peak of the AC input- voltage. With the switch off, the rectified output of the bridge is connected to the capacitor through the diode. The switch is turned on to increase current through the inductor and turned off to decrease current through the inductor. Turning off the switch dumps the energy from the inductor to the capacitor. For 60 Hz inputs, the switch may be operated at a rate of 40 kHz to 75 kHz, thereby providing precise control of the input current to match the input voltage waveform This is a switching rate of about 1000 times the input line frequency For AC systems operating at high line frequencies, such as 20 kHz, this high frequency ratio is not practical. For high efficiency, a ratio of 10 times the line frequency would be more practical. A lower switching frequency requires the use of a larger inductor to keep the ripple current down to a reasonable level. The larger inductor causes a cross-over distortion problem. Near zero cross-over, there is no input voltage available to drive current into the inductor The current lags the input voltage causing a notch effect in the current waveform with low order harmonics which are difficult to filter.

It is therefore desirable to devise a single phase rectifier circuit which operates with relatively low input current distortion but operates at a relatively low switching rate such that it is practical for use in relatively higher frequency AC systems.

SUMMARY OF THE INVENTION

Single phase rectifier circuits constructed in accordance with the present invention produce a full wave rectified voltage by rectifying an AC input voltage and coupling the rectified voltage to a filter capacitor through an inductor. A switching circuit is provided for switching the sum of the rectified voltage and the voltage on the capacitor across the inductor to drive current through the inductor thereby storing energy in the magnetic field of the inductor. Turning off the voltage to the inductor transfers this energy to the capacitor, thereby boosting the voltage on the capacitor. In the preferred embodiment, the switching circuit is a half bridge boost converter.

This invention encompasses both rectifier circuits constructed as discussed above and the method of power factor improvement performed by those circuits. The invention utilizes the capacitor voltage to drive inductor current when the magnitude of the rectified voltage is insufficient to perform this function This permits a reduction in input current distortion with a relatively low switching frequency. Such circuits have reduced losses at high AC line frequencies and can be implemented in a voltage feedback loop of a voltage regulator to provide control of the rectified output voltage magnitude.

DESCRIPTION OF THE DRAWINGS

The invention will become more readily apparent from the following description of the preferred embodiment thereof, shown by way of example only, in the accompanying drawings, wherein.

DESCRIPTION OF THE PREFERRED EMBODIMENTS

Figure 1:
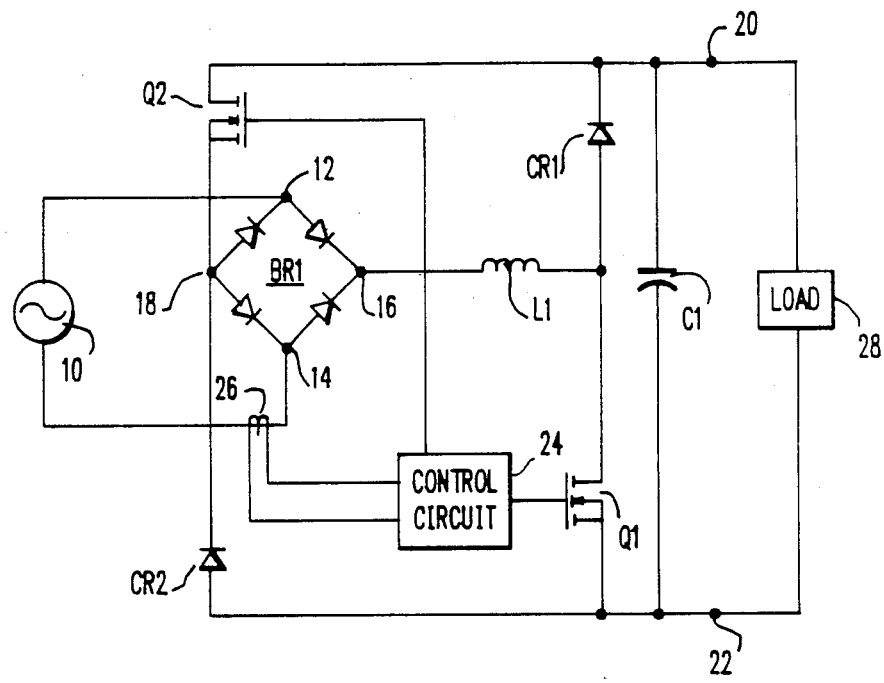
FIG. 1 is a simplified schematic diagram of a rectifier circuit constructed in accordance with one embodiment of the present invention.

Referring to the drawings, FIG. 1 is a simplified schematic diagram of a single phase, rectifier circuit constructed in accordance with one embodiment of the present invention. An AC input voltage is provided by an external source 10 to input terminals 12 and 14 of a full wave rectifier bridge BR1. This results in a full wave rectified voltage at the output terminals 16 and 18 of the bridge. A circuit branch comprising the series connection of an inductor L1 and a diode CR1 is electrically connected between a first bridge output terminal 16 and a load terminal 20. An output capacitor C1 is connected between the load terminals 20 and 22. A pair of controllable switching devices, in the form of field effect transistors Q1 and Q2, and a pair of diodes, CR1 and CR2, are connected to form a half bridge boost converter circuit. A control circuit 24 senses the input current to the bridge via current transformer 26 and controls the operation of transistors Q1 and Q2 in a manner which reduces the input current distortion.

With both Q1 and Q2 off, the rectified voltage from bridge BR1 is connected to the load 28 through diodes CR1 and CR2. With both Q1 and Q2 on, the DC voltage across capacitor C1 is connected in series with the bridge output voltage to increase the current through inductor L1 at a faster rate by applying this increased voltage.

Figure 2:
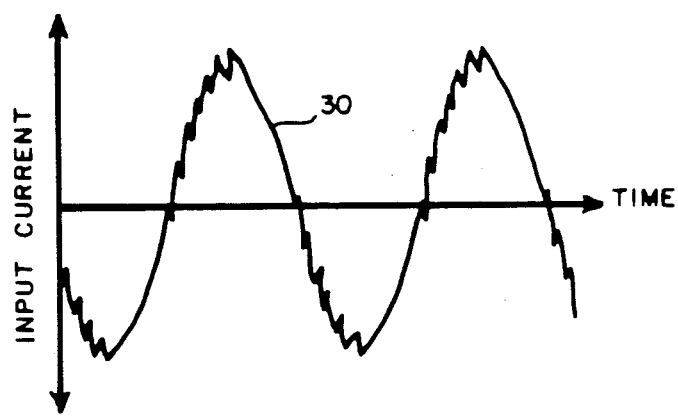
FIGS. 2, 3, and 4 are waveforms illustrating the operation of the circuit of FIG. 1.

FIG. 2 is a waveform 30 of the input current for the circuit of FIG. 1. Note that there is no notch at zero current to cause low order harmonic distortion. The waveform illustrated in FIG. 2 has about 1.5% 3rd harmonic and 1.2% 5th harmonic with a total harmonic distortion of about 7.3%. If a simple low pass LC filter tuned to the 7th harmonic is added to the input of the circuit of FIG. 1, the input current distortion is reduced even further as illustrated by waveform 32 of FIG. 3. Waveform 32 has a total harmonic distortion of about 4.1%.

Figure 3:
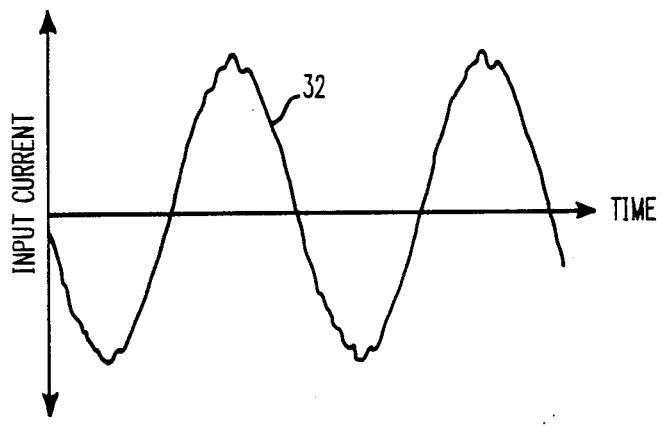
Figure 4:
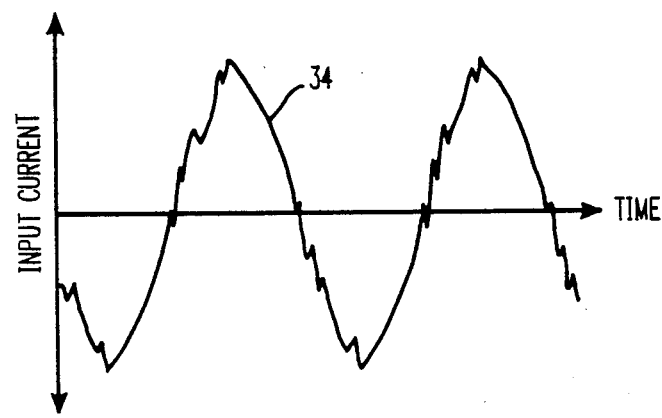

The relatively low distortion input current waveforms of FIGS. 2 and 3 were obtained with a switching frequency of about 12 times the fundamental AC input frequency. To improve efficiency, it is desirable to reduce the switching frequency even further. Waveform 34 of FIG. 4 shows the results obtained with a modification in the operation described above. For this waveform, the drive signal to transistor Q1 or Q2 is disabled when there is sufficient voltage at the bridge output to drive the inductor current. The circuit then reverts to the normal boost converter configuration in which only one transistor is switched. This lowers the voltage applied to the inductor and eliminates the extra switching points at the top of the current waveform. FIG. 4 shows about 8 switches per cycle. The unfiltered current waveform has a total harmonic distortion of about 6.6% compared to about 7.3% for FIG. 2. Better performance is obtained with a lower switching frequency by using this switched mode of operation.

Figure 5A:
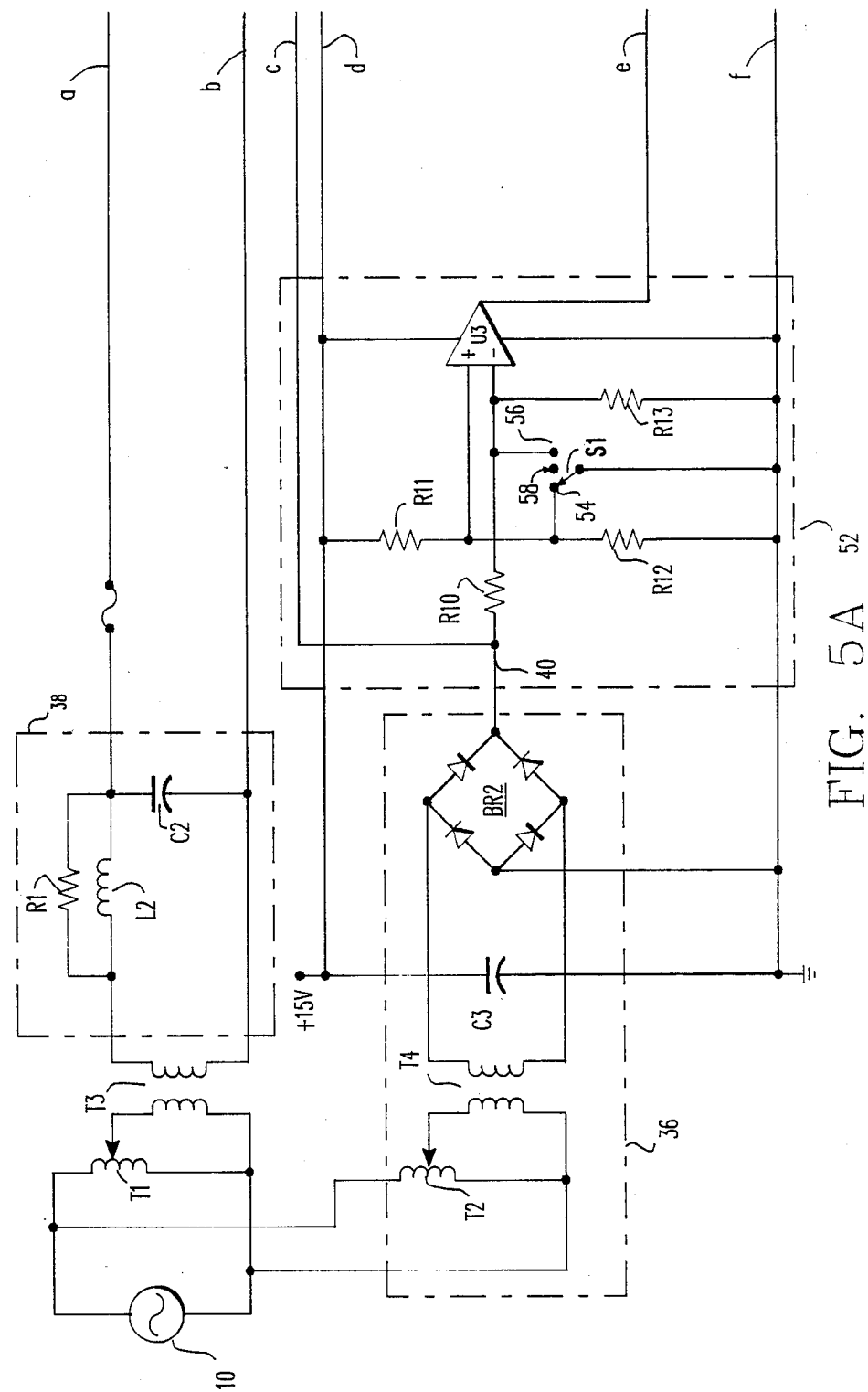
FIGS. 5A and 5B are schematic diagrams of one implementation of the circuit of FIG. 1.
Figure 5B:
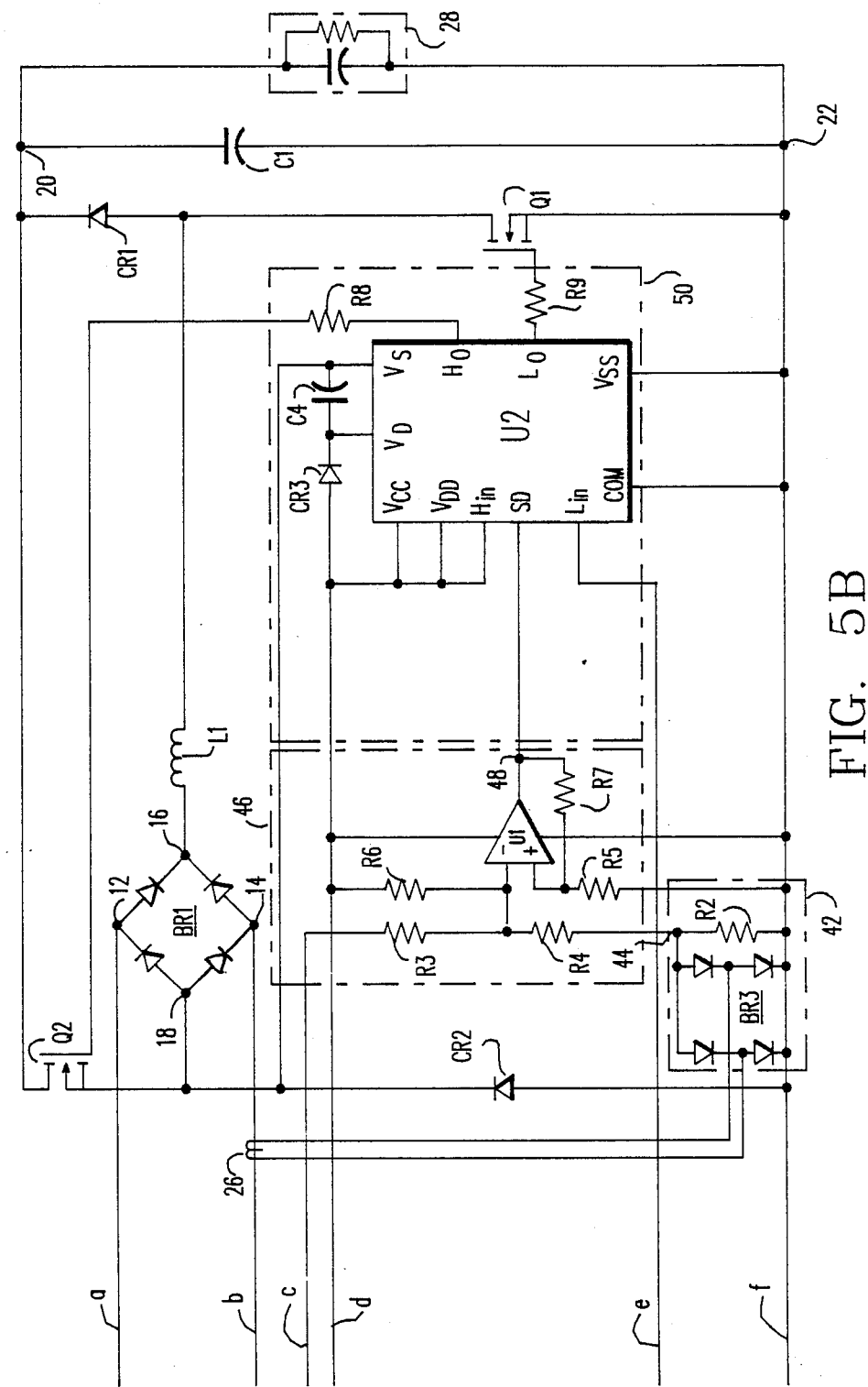

FIGS. 5A and 5B are schematic diagrams of a circuit which was built in accordance with this invention to prove the performance and obtain the current waveforms illustrated in FIGS. 2, 3, and 4. For clarity, lines connecting FIGS. 5A and 5B are labeled a, b, c, d, e and f. AC power from an external source 10 is delivered to the circuit through a variable autotransformer T1 and an isolation transformer T3. A low pass filter 38, comprising resistor R1, inductor L2 and capacitor C2, is inserted between t output of transformer T3 and bridge BR1. Circuit 36, comprising variable autotransformer T2, isolation transformer T4 and bridge rectifier BR2, produces a separately adjustable and isolated reference voltage at point 40. An input current sensing circuit 42 comprising bridge BR3 and resistor R2, receives a current signal representative of the input current to bridge BR1 from current transformer 26 and produces a voltage representative of that input current at point 44. A comparator circuit 46 comprising amplifier U1, and resistors R3, R4, R5, R6, and R7, compares the voltages at points 40 and 44 and produces a control signal at point 48. This control signal is utilized by a drive circuit 50 comprising an isolated half bridge driver U2 (e.g. IR2110), diode CR3, capacitor C4, and resistors R8 and R9, to control the operation of transistors Q1 and Q2. In the comparator circuit, resistors R6 and R7 can be varied to control the hysteresis of the control circuit to reduce the number of switching points in the waveform.

A switching mode control circuit 52 comprising amplifier U3, and resistors R10, R11, R12 and R13 allows the circuit of this invention to be operated in the normal booster, half bridge, or switched modes described above. When switch S1 is connected to terminal 54, the noninverting input of amplifier U3 is grounded, causing its output to be low. This disables the drive for transistor Q1 so the circuit operates as a normal booster. With S1 connected to terminal 56, the inverting input of amplifier U3 is grounded, forcing the output high. This causes the drive for transistor Q1 to switch at the same time as the drive for transistor Q2, causing half bridge operation. With S1 connected to terminal 58, amplifier U3 switches low when the reference voltage exceeds a predetermined magnitude, for example, 72 volts for a 115 volt 400 Hz AC input. This causes the circuit to operate in the switched mode as described above, changing from half bridge to normal booster operation during the cycle. The circuit can also be operated as a normal rectifier by removing control power or adjusting the reference voltage at point 40 to zero.

With the controls activated, the output voltage can be adjusted up to 200 volts DC for a 115 volt AC input. When operated as a closed loop system, the reference input would be derived from a separate winding on the power transformer, rectified, and multiplied by a DC voltage error signal, resulting in control of the output DC voltage as well as input current distortion.

It should now be apparent that this invention controls input current distortion of a single phase rectifier, to improve the power factor, with the lowest possible switching frequency This reduces losses at high line frequencies. The circuit can also be implemented in a voltage feedback loop to provide control of the rectified output voltage. Although the present invention has been described in terms of what is presently to be is preferred embodiment, it will be apparent to those skilled in the art that various changes may be made without departing from the scope of the invention. It is therefore intended that the appended claims cover such changes.

What is claimed is:

1. A single phase rectifier circuit comprising:
   means for producing a full wave rectified voltage by rectifying an AC input voltage;
   means for coupling the rectified voltage to a filter capacitor through an inductor; and
   means for repeatedly switching the sum of said rectified voltage and the voltage on said capacitor across said inductor, thereby alternately driving current through said inductor, to store energy in a magnetic field of said inductor, and transferring said energy to said capacitor, to reduce distortion of the AC input current.

2. A single phase rectifier circuit comprising:
   a full wave bridge rectifier having first and second input terminals for receiving a single phase ac input voltage, and having first and second output terminals;
   an inductor electrically connected to said first bridge output terminal;
   a first diode electrically connected in series with said inductor and connected between said inductor and a first load terminal;
   a first controllable switching device electrically connected between a junction point, between said inductor and said first diode, and a second load terminal;
   a capacitor electrically connected across said first and second load terminals;
   a second controllable switching device electrically connected between said first load terminal and said second bridge output terminal;
   a second diode electrically connected between said second load terminal and said second bridge output terminal; and
   means for controlling the operation of said controllable switching devices.

3. A single phase rectifier circuit as recited in claim 2, wherein said means for controlling the operation of said controllable switching devices comprises:
   a current sensing circuit for producing a first signal representative of the input current to said bridge;
   a reference circuit for producing a reference signal;
   a comparator circuit for producing a control signal in response to the relative magnitude of said first signal and said reference signal; and
   a drive circuit for controlling the operation of said first and second controllable switching devices in response to said control signal 4. A single phase rectifier circuit as recited in claim 2, wherein:
   said means for controlling the operation of said controllable switching devices turns said first and second controllable switching devices on and off simultaneously.

5. A single phase rectifier circuit as recited in claim 2, wherein:
   said means for controlling the operation of said controllable switching devices turns said first and second controllable switching devices on and off simultaneously as long as the rectified voltage from said bridge is below a preselected magnitude; and
   said means for controlling the operation of said controllable switching devices maintains said second controllable switching device off and turns said first controllable switching device on and off repeatedly as long as the rectified voltage from said bridge is above a preselected magnitude 6. A method of improving power factor in a single phase rectifier circuit, said method comprising the steps of:
   producing a full wave rectified voltage by rectifying an AC input voltage;
   coupling the rectified voltage to a filter capacitor through an inductor; and
   repeatedly switching the sum of said rectified voltage and the voltage on said capacitor across said inductor, thereby alternately driving current through said inductor, to store energy in a magnetic field of said inductor, and transferring said energy to said capacitor, to reduce distortion of the AC input current.

7. A method of improving power factor in a single phase rectifier circuit as recited in claim 6, wherein said step of repeatedly switching the sum of said rectified input voltage and the voltage on said capacitor across said inductor comprises the steps of:
   producing a first signal representative of the input current to a bridge;
   producing a reference signal;
   producing a control signal in response to the relative magnitude of said first signal and said reference signal; and
   controlling the operation of said first and second controllable switching devices in response to said control signal.

8. A method of improving power factor in a single phase rectifier circuit as recited in claim 6, wherein:
   the step of repeatedly switching the sum of the rectified voltage and the voltage on the capacitor is discontinued after the rectified voltage reaches a preselected magnitude, and thereafter, only the rectified voltage is repeatedly switched across said inductor.

* * * * *